US012703267B2

(12) United States Patent
Hu et al.

(10) Patent No.: US 12,703,267 B2
(45) Date of Patent: Aug. 11, 2026

(54) ELECTRIC VEHICLE PREDICTIVE THERMAL CONTROL

(71) Applicant: FORD GLOBAL TECHNOLOGIES, LLC, Dearborn, MI (US)

(72) Inventors: Qiuhao Hu, Ann Arbor, MI (US); Ashley Peter Wiese, Ann Arbor, MI (US); Julia Helen Buckland Seeds, Wolverine Lake, MI (US); Eduardo Perez Guzman, Aachen (DE); Erik Biberstein, Novi, MI (US); Judhajit Roy, Royal Oak, MI (US); Yanan Zhao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 650 days.

(21) Appl. No.: 18/191,246

(22) Filed: Mar. 28, 2023

(65) Prior Publication Data

US 2024/0326652 A1 Oct. 3, 2024

(51) Int. Cl.
*B60L 58/26* (2019.01)
*B60L 58/10* (2019.01)
(Continued)

(52) U.S. Cl.
CPC .......... *B60L 58/26* (2019.02); *H01M 10/613* (2015.04); *H01M 10/625* (2015.04);
(Continued)

(58) Field of Classification Search
CPC .......... B60L 58/26; B60L 58/12; B60L 58/10; B60L 2240/545; B60L 2240/60;
(Continued)

(56) References Cited

U.S. PATENT DOCUMENTS 9,846,886 B2 12/2017 Greene et al.
10,473,474 B2 * 11/2019 Rajagopalan ...... G01C 21/3469
(Continued)

FOREIGN PATENT DOCUMENTS

CN 111834691 A 10/2020
CN 115195530 A 10/2022

*Primary Examiner* — David P. Merlino
*Assistant Examiner* — Mahmoud M Kazimi
(74) *Attorney, Agent, or Firm* — Joseph Zane; Brooks Kushman P.C.

(57) ABSTRACT

A method includes determining a first probable amount of aggregate heat generated by a vehicle battery over a time interval, for each of a plurality of possible travelable paths to possible destinations, achievable within the time interval. The method also includes determining a second probable amount of aggregate heat generated by the battery over another time interval for each of a plurality of second possible travelable paths to possible second destinations from the possible first destinations. The method includes determining a maximum probable amount of aggregate heat generated over the first and second time intervals, and, responsive to the maximum amount of aggregate heat generated over the second time interval exceeding predefined cooling capacity and responsive to the maximum amount of aggregate heat generated over the first time interval being less than the predefined cooling capacity, scheduling pre-cooling of the battery during the first time interval.

9 Claims, 3 Drawing Sheets

(51) Int. Cl.
*B60L 58/12* (2019.01)
*H01M 10/613* (2014.01)
*H01M 10/625* (2014.01)
*H01M 10/633* (2014.01)

(52) U.S. Cl.
CPC ..... *H01M 10/633* (2015.04); *B60L 2240/545* (2013.01); *B60L 2240/60* (2013.01); *H01M 2220/20* (2013.01)

(58) Field of Classification Search
CPC .......... B60L 2240/662; B60L 2260/56; H01M 10/613; H01M 10/625; H01M 10/633; H01M 2220/20
See application file for complete search history.

(56) References Cited

U.S. PATENT DOCUMENTS

| | | | | |
|---|---|---|---|---|
| 11,014,466 | B2 * | 5/2021 | Sinha | B60L 58/13 |
| 11,040,635 | B2 | 6/2021 | Hettrich et al. | |
| 11,084,398 | B2 | 8/2021 | Marcicki et al. | |
| 12,387,087 | B2 * | 8/2025 | Aslandere | G07C 5/004 |
| 12,523,481 | B2 * | 1/2026 | Wray | G01C 21/3469 |
| 2021/0229570 | A1 * | 7/2021 | Futter | B60L 1/02 |

* cited by examiner

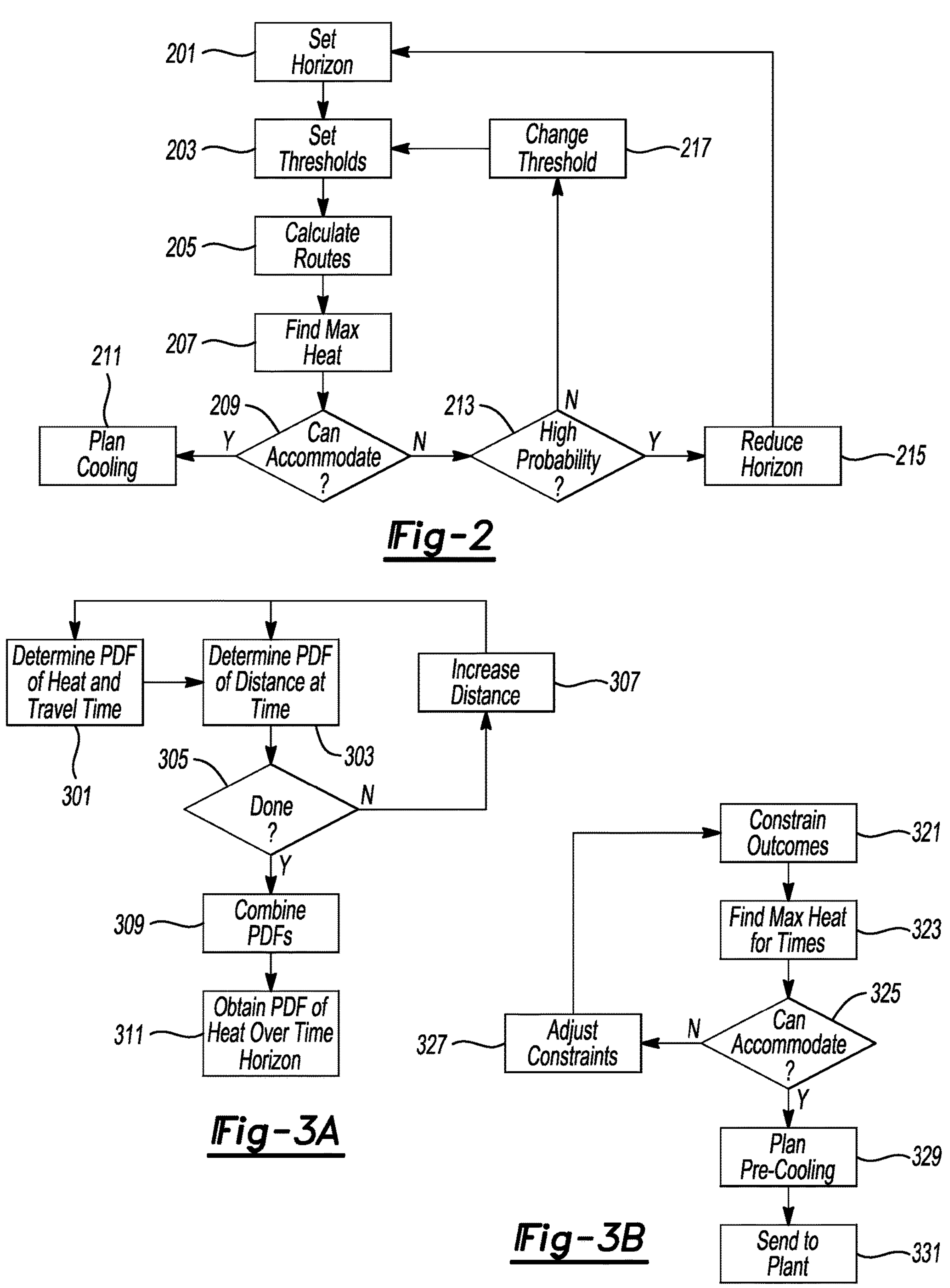
201
Set Horizon
203
Set Thresholds
205
Calculate Routes
207
Find Max Heat
209
Can Accommodate ?
Y
N
211
Plan Cooling
213
High Probability ?
N
Y
215
Reduce Horizon
217
Change Threshold
Fig-2
Determine PDF of Heat and Travel Time
301
Determine PDF of Distance at Time
303
305
Done ?
N
Y
Increase Distance
307
309
Combine PDFs
311
Obtain PDF of Heat Over Time Horizon
Fig-3A
Constrain Outcomes
321
Find Max Heat for Times
323
325
Can Accommodate ?
N
Y
327
Adjust Constraints
Plan Pre-Cooling
329
Send to Plant
331
Fig-3B

ELECTRIC VEHICLE PREDICTIVE THERMAL CONTROL

TECHNICAL FIELD

The illustrative embodiments generally relate to predictive thermal control for electric vehicles. More specifically, they relate to electric vehicle predictive thermal control using probabilistic route predictions.

BACKGROUND

Electric vehicles are becoming a more popular travel solution, and can provide greater ranges (on a single charge) than gasoline-based counterparts can on a full tank. Despite the increased range, a variety of factors can affect battery performance and overall health. One factor that can have an effect on both performance and health of the battery is battery temperature.

Battery temperature can be affected by both usage and by ambient temperature. At extremely low or extremely high temperatures, batteries may be susceptible to long-term health degradation and immediate performance degradation. Since the batteries generate heat upon usage, they may be more capable of maintaining minimum temperatures once operational, without significant external heating. Cooling, on the other hand, can use significant power and can affect vehicle range.

Cooling prediction methods have been proposed that rely on operator input to define a route, and then the vehicle can determine potential heat generation over the route and attempt to maintain a battery cooling strategy that keeps the battery below a threshold temperature for the duration of travel. Many users will frequently use a vehicle without inputting a destination, however, making it difficult to rely exclusively on this solution for all travel needs. In the absence of a destination, the battery plant may be unable to accurately guess cooling needs for a long journey, and may end up in a situation during travel where cooling needs outstrip the available or preferred power usage for cooling, resulting in a battery operating over a recommended temperature.

SUMMARY

In a first illustrative embodiment, a system includes one or more processors configured to a) divide all roads within a predefined distance from a starting point into segments, for a plurality of consecutive predefined distances from a starting point. The one or more processors are also configured to b) determine a likelihood of travel, of a vehicle, along at least one path of segments leading to each road segment within each predefined distance of the plurality of consecutive predefined distances; and c) determine a projected battery demand of a battery of the vehicle for travel to each segment along each at least one path within each predefined distance, based on a respective likelihood of travel for each road segment within each respective distance.

Also, the one or more processors are configured to d) determine a projected heat generation for the travel to each segment along each at least one path within each predefined distance, based on a respective projected battery demand for each road segment within each respective distance, in terms of heat generated over projected travel time projected to be used for the travel to each segment; and e) determine, for a plurality of consecutive time intervals, maximum accumulated projected heat generation for travel during each of the time intervals or maximum accumulated projected heat generation with at least a threshold likelihood of occurrence based on likelihood of travel on a respective path resulting in the maximum accumulated projected heat generation.

The one or more processors are additionally configured to f) determine, for at least each time interval wherein the maximum battery temperature exceeds a predefined threshold, battery cooling required to keep the battery temperature below the predefined threshold and g) determine, for each time interval wherein required battery cooling exceeds a predefined maximum cooling capacity, excess cooling required to prevent the battery temperature exceeding the specified temperature threshold.

The one or more processors are also configured to h) determine, for each time interval wherein required battery cooling is below a predefined maximum cooling capacity, the excess cooling available within the given time interval. Further, the one or more processors are configured to i) for a last time interval of the time intervals during which there is determined excess required cooling, schedule cooling, using determined excess achievable cooling of one or more time periods prior to the last time interval during which there is determined excess required cooling. The one or more processors are also configured to j) determine remaining maximum excess achievable cooling for all time intervals prior to the last time interval of the time intervals during which there is determined excess required cooling, in light of projected maximum accumulated heat generation combined with any additionally scheduled cooling for all time intervals prior to the last time interval of the time intervals during which there is determined excess required cooling. The one or more processors are configured to repeat steps i) and j) until at least one of either: all excess required cooling of each respective time interval requiring excess cooling is accounted for by excess achievable cooling of prior time interval having excess achievable cooling; or all excess achievable cooling is accounted for based on scheduled cooling.

In a second illustrative embodiment, a system includes one or more processors configured to determine a first probable amount of aggregate heat generated by a battery of a vehicle over a first time interval for a plurality of first possible travelable paths to possible first destinations from a current location of the vehicle and achievable within the first time interval. The one or more processor are also configured to b) determine a second probable amount of aggregate heat generated by the battery over a second time interval for a plurality of second possible travelable paths to possible second destinations from the possible first destinations and achievable within the second time interval. Further, the one or more processors are configured to determine a maximum probable amount of aggregate heat generated over the first and second time intervals; and, responsive to the maximum amount of aggregate heat generated over the second time interval exceeding a predefined maximum cooling capacity and responsive to the maximum amount of aggregate heat generated over the first time interval being less than the predefined maximum cooling capacity, schedule precooling of the battery during the first time interval to cool the battery beyond what is required to accommodate the maximum probable amount of aggregate heat generated over the first time interval.

In a third illustrative embodiment, a method includes determining a first probable amount of aggregate heat generated by a battery of a vehicle over a first time interval for a plurality of first possible travelable paths to possible first destinations from a current location of the vehicle and achievable within the first time interval and determining a second probable amount of aggregate heat generated by the battery over a second time interval for a plurality of second possible travelable paths to possible second destinations from the possible first destinations and achievable within the second time interval. The method also includes determining a maximum probable amount of aggregate heat generated over the first and second time intervals, and, responsive to the maximum amount of aggregate heat generated over the second time interval exceeding a predefined maximum cooling capacity and responsive to the maximum amount of aggregate heat generated over the first time interval being less than the predefined maximum cooling capacity, scheduling precooling of the battery during the first time interval to cool the battery beyond what is required to accommodate the maximum probable amount of aggregate heat generated over the first time interval

BRIEF DESCRIPTION OF THE DRAWINGS

FIG. 2 shows an illustrative planning process;

FIGS. 3A and 3B show a more detailed illustrative planning process; and

DETAILED DESCRIPTION

Figure 1:
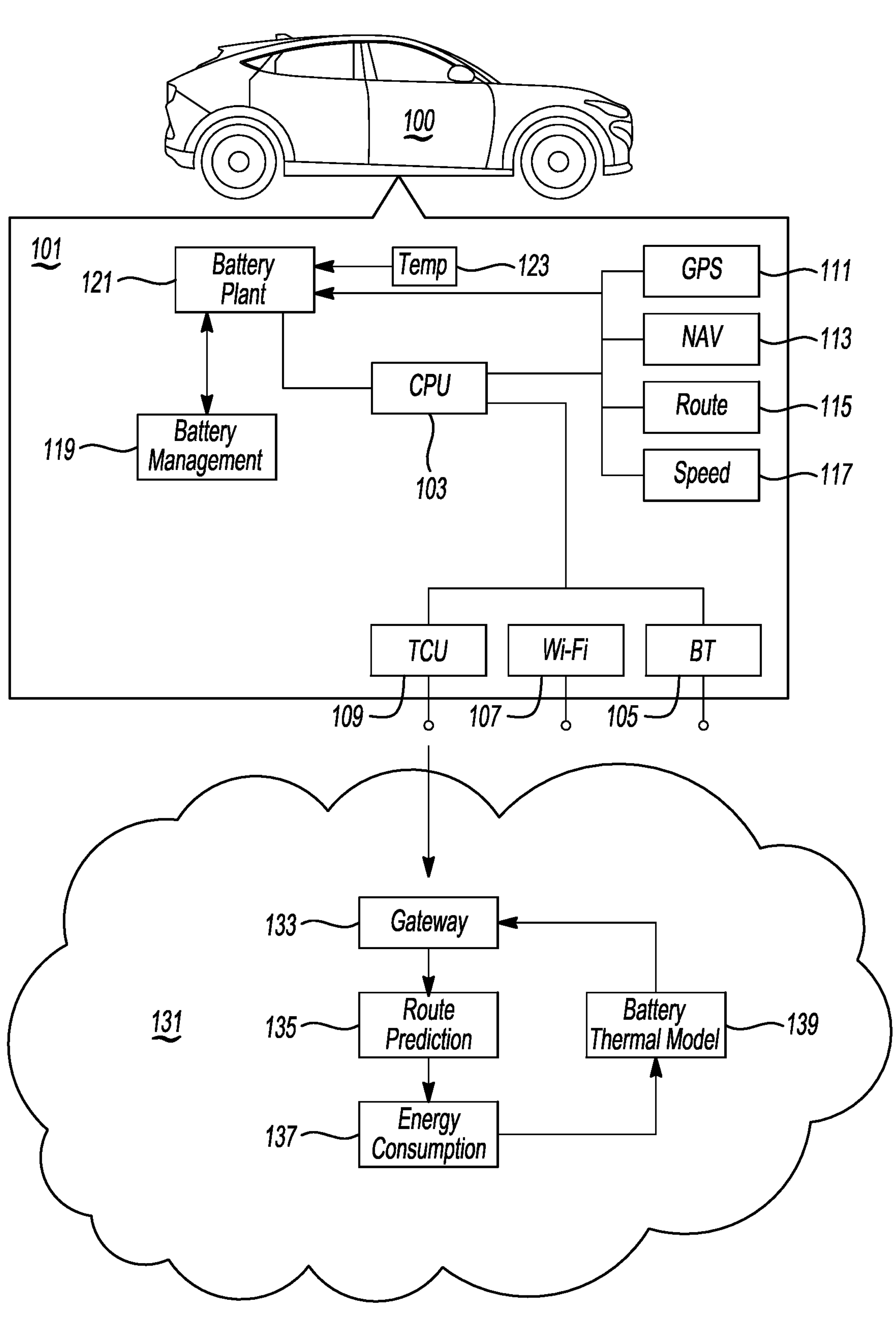
FIG. 1 shows an illustrative example of a vehicle and cloud system for battery cooling planning.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose that a probabilistic route calculation be used in conjunction with heat projections to determine a set of many or all likely paths from a given location to any number of possible destinations (which may be bounded by time, distance or other constraints). Once all or a reasonable number of possible next-segments of possible travel paths are known, the system can predict the maximum heat usage probability for this path set and plan a strategy that accommodates the bounded set of paths, regardless of which of those paths a user actually takes.

That is, many of the paths may not require as much cooling as a "hottest" path, but by planning for the hottest path (in terms of predictive cooling), then all cooler paths will also be accommodated. The hottest path can also be the hottest path with a threshold likelihood of occurrence. That is, it can be specified that only predictions with a certain likelihood (e.g. >5%) should be considered. This removes unlikely edge cases and circular travel paths, among other things. Predictive cooling, in this sense, is pre-cooling of the battery at a point in time prior to when excessive cooling (relative to maximum cooling capacity) may be needed, so that by the time the vehicle reaches the point that would otherwise have required excessive cooling, the battery is cooler than it otherwise would have been (without precooling) and thus the vehicle can manage any remaining necessary cooling by using the onboard cooling available.

Put another way, at earlier points in the journey, prior to an excessive cooling point, the vehicle will use more cooling power than it technically needs to use for that segment of the journey, in order to maintain a battery temperature that will not rise above a preferred level at the excessive cooling point. Moreover, the excessive cooling point will then become a regular cooling point, because the vehicle will enter that segment with a cooler battery than it would have if there had not been pre-cooling, and therefore will be able to maintain a battery temperature below the maximum using the available cooling.

When the destination is known, the plan may accommodate for simply the hottest planned segment along a known route, with much more certainty. When the destination is unknown, the plan may accommodate all possible routes with a threshold probability, so that the cooling plan should usually accommodate whatever route the user takes. Of course, the user could go off-route (take a low probability route) that was not accommodated. But, at the same time, the process for planning can continually update based on actual decisions, and so as a user moves along a low probability route, that route becomes a high probability route. And unless the battery is already at or near peak-heat, it still should be possible, under most circumstances, to adapt to the new, now high-probability, path, based on continual observation and adjustment as the vehicle travels. That is, the cooling plan does not have to remain fixed, it changes as probabilities become certainties and new probabilities emerge.

It may also be the case that the vehicle only looks some distance (e.g., a certain number of miles) ahead, known as the horizon. Because it is theoretically possible to have an infinite number of paths from many locations to many other locations more than a certain distance out, especially if back-tracking is accommodated, it may be reasonable to bound the determination in some manner. Once the user chooses and travels along a certain path, the probabilities shift in any event, and so continual changes are made to predictions. Discussion of probabilistic route determination is covered in greater detail in co-owned U.S. application Ser. No. 17/209,311, filed on Mar. 23, 2021, the entire contents of which are hereby incorporated by reference. That is not the only way that probable routes can be determined, but it provides at least one example of such determinations.

In the co-owned application, an example probabilistic route determination is described that segments all routes into segments based on spans between intersections. A vehicle probability of taking a given path of segments, to a point on a circular distance horizon from a current vehicle location, is determined based on aggregate probability that the vehicle maintains the path as it passes through each intersection to another segment. Thus, it is possible to determine all probabilities of all segment paths to each point where a road intersects the distance horizon from the current location. Some probabilities are also set to zero, such as the probability of retracement, to prevent an endless loop between two intersections having a very low, but non-zero, probability. At least one path may be calculated for each point where the road intersects the distance as a highest probability path, but other paths having lower probabilities may also be determined. In the aggregate, this allows for a probability distribution function representing the likelihood of a vehicle taking any given path of segments to any point of intersection with the distance horizon to which a respective path leads.

Further, it may be reasonable to bound the probability set in several manners when planning cooling, such as planning based on combinations of route segments having more than X % likelihood of occurrence. This prevents having to plan cooling for edge cases that have a very low likelihood of occurrence. Additionally, since an edge case may become a threshold case as the vehicle selects what appeared to be a low-probability path, the continual changing of the cooling model should be able to accommodate that change under most circumstances.

Finally, it may be the case that a certain set of routes has a "hottest" path that cannot be accommodated by the planning. If the path is near the edge of the threshold likelihood (e.g., if the threshold was at least 15% likelihood and the path was 16% likely, the system may adjust the threshold to 17% and accommodate the remaining possible paths. If the path was a high probability path, the system may decrease the distance horizon for probability and, if a user is ultimately resolving to travel down that high probability path (which will be revealed with travel), the user may be alerted to take additional measures related to cooling or that the battery will be operating above a preferred temperature for at least a period of time. By reducing the distance horizon, the system accommodates all instances where the path does not result in the one particular problem path. An alternative would be to simply maximally cool the battery until it was clear whether the user was or was not going in the direction of concern, but that may also use excessive power relative to all the times the user would end up taking an alternative and accommodatable path.

Whichever solution is chosen, the point is that it is possible to accommodate a wide variety of possible outcomes without requiring the user to actually tell the vehicle anything about where the user intends to travel. Since that (an absence of input destination) is a common travel state for many journeys, the illustrative embodiments serve a useful role in protecting batteries and increasing battery utility when a user does not input a destination.

Unlike existing methods for battery thermal management that require deterministic preview information, the illustrative embodiments can leverage probabilistic preview information to estimate the battery temperature increase over a long-range horizon and provide cooling power demands to keep operation within preferred constraints.

FIG. 1 shows an illustrative example of a vehicle and cloud system for battery cooling planning. An illustrative framework consists of two components-a modeling component and an onboard thermal management component that can apply the probabilistic information.

In the illustrative example, a vehicle 100 includes an onboard computing system 101 with one or more processors 103. The vehicle 100 includes a variety of communication mediums, such as BLUETOOTH 105, Wi-Fi 107 and a telematics control unit (TCU) 109. In this example, the TCU provides vehicle information to the cloud 131 and receives back periodic battery cooling plan updates. It is also possible to perform some calculations onboard as needed and based on the computing power of the vehicle 100 and what other resources need that computing power. In many instances, however, using the cloud is more efficient.

The vehicle computer may include a number of data gathering functions such as, for example, GPS 111, a nav system 113, route planning 115 and a speed sensor 117. The GPS data can be provided for a current vehicle location. The navigation system may determine vehicle heading. The route process may include historic routes, which may be useful for adjusting probabilities for a given vehicle+driver combination, or even simply a given driver or given vehicle. Vehicle speed may be used by the cloud to determine heat generation, among other things, as well as likelihoods of a vehicle passing a distance threshold within a given time period.

The vehicle 100 may pass the relevant information to the cloud 131 through gateway 133, which can serve for request and response handling. In this example, the relevant vehicle data is passed to the route prediction model 135 first.

The modeling component can combine, for example, route predictions, a vehicle energy consumption model and a battery thermal model to provide probabilistic information on battery heat generation and temperature changes within a given horizon. This can be used to determine the minimal cooling power preferred or needed over the horizon based on a worst-case scenario (or a worst-case scenario that has at least a predefined threshold likelihood of occurrence based on predicted likelihood of travel). This prevents maximally cooling when it may not be necessary, which saves power, and at the same time keeps battery temperatures at manageable levels so that operation under excessive battery temperatures is generally prevented. In situations where route prediction is not used, vehicles may over-use cooling resources just to generally keep a battery cooler than necessary.

Route prediction can use the modeling discussed above, utilize traffic simulations, V2V data from local, proximate vehicles, etc. Prediction can include destinations, travel times, speeds, etc. This data can serve as an input to an energy prediction service to predict power demands for traction, thermal management, accessory usage, etc. The energy prediction outcome may be probabilistic instead of deterministic, to account for the varied possibilities of travel paths.

The output of route prediction and any relevant vehicle data can then be used to predict a probability distribution function of heat generation and temperature increase based on a mathematical model of battery behavior that takes predicted battery energy consumption 137 and translates it to battery thermal behavior 139. This could use an equivalent circuit model and a lumped thermal mass model, or other alternative models. Alternatives can include machine learning models and higher fidelity physics based models, provided those models include the features needed to determine heat generation and represent the dynamics of battery temperature.

By combining a route prediction service, a vehicle energy consumption model and the battery thermal model, it is possible to generate a probabilistic prediction of battery temperature. The vehicle behavior preview provided by the route prediction service may initially be defined in the distance domain over small road segments. Therefore, after the above transformations, the probabilistic battery heat generation and temperature increase are also defined in the distance domain over the same road segments. Conversion to time domain may make the information more effective for time-based thermal management.

Thermal predictions for various possible routes can be passed back to the vehicle to build a planning strategy 119 to be implemented by the battery plant at 121. The plan may also accommodate current ambient temperatures 123, which may also vary with travel. The vehicle can initially plan for the present set of probabilities and adjust responsive to new thermal data and new probability data as the current probabilities resolve into certainties and new probabilities come to light. Planned cooling can continually adapt to the worst-case cooling needs within a bounded set of likely outcomes.

FIG. 2 shows an illustrative planning process. In this example, the prediction engine sets a horizon for route prediction at 201. This may be a fixed number and the battery plan may simply have to accommodate the results, or the prediction horizon may be variable as discussed above, responsive to actual capabilities. While the vehicle 100 may formulate a plan based on data from the prediction and modeling in the cloud, the cloud 131 may also be able to predict the plan in order to adjust variables as discussed herein.

The process also sets a threshold for accommodation in terms of likely path outcomes at 203. This can include, for example, ignoring paths of certain low probability. For example, if a path travels past a neighborhood with several exits to a main road, there is usually a very low likelihood that a user will actually take a side-trip into the neighborhood in the absence of a good reason. Therefore, many "possible" paths are also very low likelihood paths and may not need to be accommodated in order to bound the set. And, as noted before, once the user enters the neighborhood, for example, those paths immediately rise in probability and the cooling strategy can still be adapted, since it is generally working on a longer time horizon than the immediate next segment.

In this example, a plurality of possible routes are calculated at 205 and this provides a probability distribution function of possible vehicle behavior. Within a threshold of likely outcomes—e.g., bounded by the desired probability—the process can then determine a maximum heat generation and/or cooling demand for any given location at 207. While there is a less than certainty that the vehicle will actually use the route leading to this outcome, the maximum demand for the most demanding possible route can still be determined.

Then, in this example, the process determines if the vehicle can actually handle the maximum outcome at 209. For example, if one possible path lead through a desert at 130 degrees Fahrenheit, the vehicle may not be able to continually cool sufficiently for a next number of segments. If that is a high probability path at 213, the vehicle may have to change the horizon threshold at 215, to consider closer segments and then accommodate the user or alert the user if the path is actually going down the high probability outcome that cannot be handled as preferred. If the path is a low probability path at 213, the system can change the threshold at 217 as discussed above, to account for paths with higher probabilities than that path. Other possible choices would be to simply maximally cool until the question of the path was resolved and/or account for the highest heat outcome among choices that could actually be handled.

Since any given path is not a certainty at the time of prediction, there are many times when the high heat outcome will not occur in any event. And, as paths resolve, the modeling and planning can adapt, so as the high heat outcome becomes less likely, any initial excess power accommodating that outcome may quickly stop being used. On the other hand, if the high heat outcome resolves as the likely or certain path, the vehicle can do as much precooling as practical and notify the user of the undesirable operating conditions that may occur.

If the vehicle can accommodate the necessary or preferred cooling for the max heat scenario at 209, the process can move to cooling planning at 211. That can occur onboard the vehicle and/or in the cloud 131.

FIGS. 3A and 3B show a more detailed illustrative planning process. In this example, the process, such as a cloud-based process, determines a probability distribution function of accumulated heat generation and traveling time over a longer distance horizon at 301. This is effectively the sum of heat generation and traveling time over all small road segments within the horizon. This calculation can be achieved by conducting a convolution of all the probability distribution functions over the small road segments.

Then at 303, a probability distribution function of traveling distance at a given time is obtained based on the traveling time probability distribution function obtained at 301. Based on the traveling time probability function over a certain distance horizon, the probability of the traveling time being less than the given time can be determined, which represents the vehicles that can pass the distance horizon within the given time. Until complete at 305, the distance horizons are varied at 307 and the calculation of 305 is repeated over different distance horizons. The probability of crossing increased distance horizons decreases as distance increases because a longer distance tends to consume more traveling time. The difference of the probabilities over two distance horizons represents the probability of the vehicles arriving within these two distances at the give time, which can be transferred as the probability distribution function of traveling distance at given time.

Once the distance horizons have been varied and completed at 305, the process combines the probability distribution function of traveling distance at a given time with the probability distribution function of heat generation over distance horizon to achieve the probability distribution function of heat generation over the time horizon at 311.

Once this output is known, the process can move to FIG. 3B, which shows the planning aspect that may occur onboard the vehicle 100. Knowing the probability distribution function (PDF) of battery heat generation over different time periods, probabilistic constraints on the state of battery temperature are applied. A threshold (e.g., 99%) is imposed on the probability distribution function of battery heat generation, and the goal is to ensure that the possible scenarios below the threshold have no constraints violation when possible. That includes not operating at excessive heat and not allowing heat to build up beyond a point where cooling can no longer keep the heat below excessive levels.

To this end, the minimum cooling power demands over different time periods can be calculated based on the threshold heat. Note that in this process, it is not necessary to solve an optimization problem too, the minimal cooling power can be calculated based on the battery temperature model and the battery temperature increase at threshold. This accommodates the maximal predicted heat state for the possible travel at 323. Again, as noted, if the system cannot actually accommodate this state at 325, the process could request adjusted constraints from the cloud at 327, if that was desired.

If the maximum heat state can be accommodated at 325, the process can plan the cooling for the next N intervals of time at 329 and pass the plan to the battery plant at 331. By delivering the minimum cooling power demands, the battery temperature constraints can be satisfied over the entire prediction horizon. However, the obtained cooling power demands may exceed the capacity of the battery cooling system. To solve this problem, a pre-cooling strategy is applied to shift the excess cooling power to the earlier time periods, which is the effective plan that is implemented by the plant.

Figure 4:
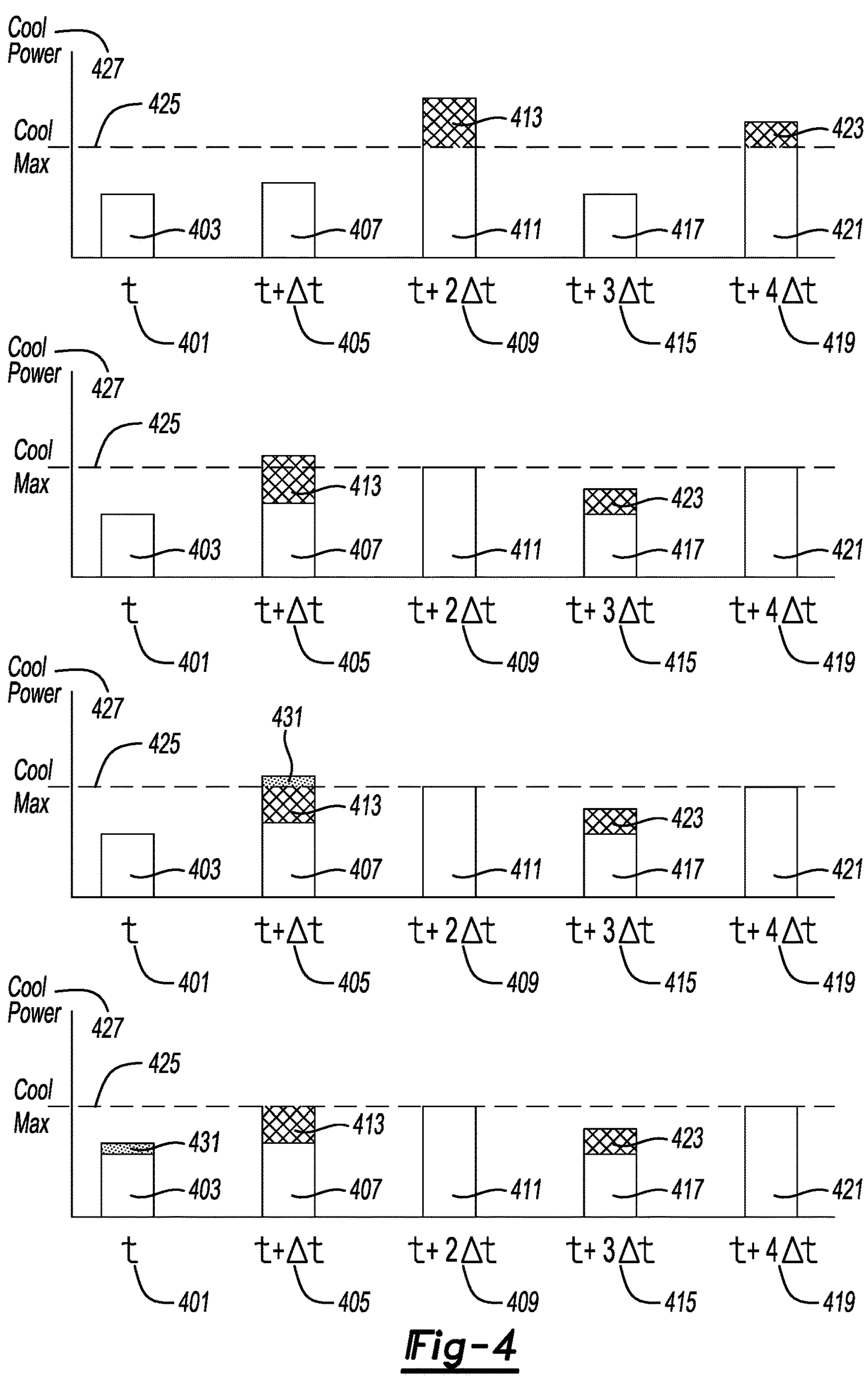
FIG. 4 shows an example of pre-cooling implementation over sequential time segments of travel.

FIG. 4 shows an example of pre-cooling implementation over sequential time segments of travel. This example shows five time segments wherein the cooling needs of two segments outstrip the maximum cooling available for those two segments based on heat generation at those times. The visual charts represent how the cooling needs are shifted forward in time when possible, to prevent excessive heat from occurring during an interval where it cannot be accommodated.

At time t at 401, the aggregate heat generation is show at 403. The maximum heat that can be handled by the cooling power is shown as the dashed line 425. So, during this interval, the battery is not creating more heat than can be handled based on predicted, possible routes.

Over the interval from t to t+Δt at 405 the heat generation 407 has increased to rise closer to the maximum possible cooling power, but still remains under the threshold, and so regardless of the routes a driver chose during the time t+Δt, there would not be excessive heat produced.

Then, however, over the interval t+Δt to t+2Δt at 409, the aggregate heat 411, 413 far exceeds the threshold 425. The amount of heat over the maximum is shown as hashed area 413. If precooling were not applied and the vehicle took the "hottest" probable path, this is the projection of how much excessive heat, beyond the vehicle's ability to cool, would remain. The vehicle would then be forced to operate under these conditions, potentially decreasing efficiency and/or battery life.

For paths achievable leading to the t+3Δt at 413, excess heat 417 has again fallen back below the cooling threshold line 425. Finally, at time t+4Δt, the system again heats 421 beyond the vehicle's maximum cooling ability, with the excess shown as 423.

For any such a plot, the vehicle's ability to handle a pre-cooling strategy is generally, at any point in time, the aggregate amount of excess heat predicted at that time compared to the amount of excess cooling ability over prior time intervals. If the excess heat is less than the amount of excess cooling ability, the heat can be accommodated. There may also be cooling maximums, based on ambient temperature or other factors.

In the example shown in FIG. 4, the second graph shows the excess cooling needs of the last interval at t+4Δt as having been shifted forward in time to the interval ending at t+3Δt. That means that by the time the vehicle travels any path available within the t+3Δt timespan, the vehicle will have performed excess cooling in the amount of 423, which leaves the next interval no higher than the maximum cooling and leaves the current (t+3Δt) interval also below the maximum cooling threshold.

Continuing to work backwards towards the present time, in the third graph, excess heat from the t+2Δt interval is moved to the excess cooling area associated with the t+Δt interval. Now the t+2Δt interval does not overheat the battery beyond cooling capacity, but because of the large amount of excess cooling needed to prevent this, only a portion of excess heat 413 can actually be accommodated during the interval ending at t+Δt. There is still excess cooling needed to accommodate excess heat 431.

It is worth noting that there is not an actual movement of heat, so that there is not actually maximum "heat" present at, for example, t+Δt. Rather, the system provides overcooling at those time periods, so that an amount of cooling needed to prevent the heat during the t+2Δt interval from exceeding maximum cooling capacity during that interval. That is, the same amount of actual heat is generated at each interval, the battery is just cooled back closer to a base state more aggressively than necessary at some points.

It is also worth noting that a battery probably is not typically cooled at least below a certain base point (which may be affected by ambient temperature), and so cooling may also be bounded at certain intervals based on how much heat has actually been generated.

For example, it may not be possible to cool a battery below 60 degrees Fahrenheit on an 80 degree day. So if the required excess cooling was 35 degrees worth of cooling, but only 10 degrees of heat had been generated (e.g., the battery was at 90 degrees and started at 80 degrees), only 30 degrees of heat could be removed from the system. Limits on how much a battery can be cooled, which is presumably often at least the amount the battery has been heated, but is also likely not an unlimited amount, may serve to bound the ability to shift cooling responsibility forward.

The final step in this example is shown in the last graph, where the remaining additional needed cooling 431 is moved forward to the interval ending at t. Now the excess heat generated at the interval ending at t+2Δt is fully accommodated by the two prior intervals, resulting in a trip, regardless of where the user actually decides to go during that time interval, that will not exceed battery cooling capacity. And, as noted prior, the system can adapt the plan as a vehicle travels to continue to adjust present cooling plans to accommodate possible future intervals of time where heat requirements and cooling capacity might otherwise be exceeded without planning. Because this can be done in the absence of driver input, it may be possible for this solution to increase battery efficiency and life on a much more regular basis than systems that require a driver to input a destination.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:

one or more processors configured to:

a) divide all roads within a predefined distance from a starting point into segments, for a plurality of consecutive predefined distances from a starting point;

b) determine a likelihood of travel, of a vehicle, along at least one path of segments leading to each road segment within each predefined distance of the plurality of consecutive predefined distances;

c) determine a projected battery demand of a battery of the vehicle for travel to each segment along each at least one path within each predefined distance, based on a respective likelihood of travel for each road segment within each respective distance;

d) determine a projected battery heat generation for the travel to each segment along each at least one path within each predefined distance, based on a respective projected battery demand for each road segment within each respective distance, in terms of heat generated over projected travel time projected to be used for the travel to each segment, wherein the projected battery heat generation is determined using at least one thermal model of the battery representing thermal dynamics of the battery under projected battery usage on each segment;

e) determine, for a plurality of consecutive time intervals, maximum accumulated projected heat generation, using the thermal model of the battery, for travel during each of the time intervals and a resultant maximum battery temperature, from aggregate heat generated based on the projected heat generation of each segment projected to be traveled;

f) determine, for at least each time interval wherein the maximum battery temperature exceeds a predefined threshold, battery cooling required to keep the battery temperature below the predefined threshold;

g) determine, for each time interval wherein required battery cooling exceeds a predefined maximum cooling capacity, excess cooling required to prevent the battery temperature exceeding the specified temperature threshold;

h) determine, for each time interval wherein required battery cooling is below a predefined maximum cooling capacity, the excess cooling available within the given time interval;

i) for a last time interval of the time intervals during which there is determined excess required cooling, schedule cooling, using determined excess achievable cooling of one or more time periods prior to the last time interval during which there is determined excess required cooling;

j) determine remaining maximum excess achievable cooling for all time intervals prior to the last time interval of the time intervals during which there is determined excess required cooling, in light of projected maximum accumulated heat generation combined with any additionally scheduled cooling for all time intervals prior to the last time interval of the time intervals during which there is determined excess required cooling; and k) repeat steps i) and j) until at least one of either:

all excess required cooling of each respective time interval requiring excess cooling is accounted for by excess achievable cooling of prior time interval having excess achievable cooling; or all excess achievable cooling is accounted for based on scheduled cooling.

2. The system of claim 1, wherein the maximum accumulated heat generation is maximum accumulated heat generation with at least a threshold likelihood of occurrence based at least in part on a predefined threshold likelihood compared to a likelihood the vehicle will travel each at least one path during each of the time intervals.

3. The system of claim 1, wherein the heat generation is initially determined in terms of distance and is converted into the time domain.

4. The system of claim 1, wherein the one or more processors are further configured to determine the likelihood of travel, of the vehicle, along all paths of segments leading to each road segment.

5. The system of claim 1, wherein the likelihood of travel time for a given distance is determined as a first probability distribution function.

6. The system of claim 5, wherein the projected battery demand is determined as a second probability distribution function, reflecting probable battery usage for each at least one path of segments.

7. The system of claim 6, wherein the projected heat generation is determined as a third probability distribution function, reflecting probable heat generation for each at least one path of segments based on the probably battery usage and a thermal model of the battery of the vehicle.

8. The system of claim 7, wherein the third probability distribution function is represented in the distance domain and is converted into the time domain to reflect probably heat generation over time.

9. The system of claim 1, wherein the excess cooling is further scheduled by moving consecutively backwards through the time intervals to schedule the cooling until the excess required cooling for the last time period is accommodated by an equal amount of precooling scheduled by the scheduled cooling over one or more prior time periods, by utilizing the excess achievable cooling of time intervals closer in time to the last time interval of the time intervals during which there is determined excess required cooling before using excess achievable cooling of time intervals further in time from the last time interval of the time intervals during which there is determined excess required cooling.

* * * * *